(12) United States Patent
Sha et al.

(10) Patent No.: US 8,898,492 B2
(45) Date of Patent: Nov. 25, 2014

(54) SYSTEM, METHOD AND MOBILE TERMINAL FOR SHARING BATTERY BETWEEN MOBILE TERMINALS

(75) Inventors: Jinchuan Sha, Shenzhen (CN); Sheng Zhong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 208 days.

(21) Appl. No.: 13/517,866

(22) Filed: Jun. 14, 2012

(65) Prior Publication Data

US 2012/0266001 A1 Oct. 18, 2012

Related U.S. Application Data

(63) Continuation of application No. PCT/CN2010/073703, filed on Jun. 9, 2010.

(30) Foreign Application Priority Data

Dec. 17, 2009 (CN) .......................... 2009 1 0260372

(51) Int. Cl.
*H02J 7/00* (2006.01)

(52) U.S. Cl.
CPC ............. *H02J 7/0054* (2013.01); *H02J 7/0004* (2013.01)
USPC ........... 713/300; 320/103; 320/127; 320/128; 320/160

(58) Field of Classification Search
CPC ..................................... H02J 7/00; H02J 7/02
USPC .................. 703/300; 320/103, 127, 128, 160
See application file for complete search history.

(56) References Cited

U.S. PATENT DOCUMENTS

| | | | |
|---|---|---|---|
| 7,508,162 B2 * | 3/2009 | Lippojoki et al. ............ | 320/103 |
| 2003/0030412 A1 * | 2/2003 | Matsuda et al. .............. | 320/127 |
| 2005/0174710 A1 * | 8/2005 | Masui et al. .................... | 361/92 |
| 2006/0017839 A1 * | 1/2006 | Sawachi ........................ | 348/372 |
| 2008/0054855 A1 * | 3/2008 | Hussain et al. ............... | 320/162 |
| 2008/0074077 A1 * | 3/2008 | Wong et al. .................... | 320/103 |
| 2008/0116854 A1 * | 5/2008 | Park .............................. | 320/160 |
| 2009/0167245 A1 * | 7/2009 | Nguyen ........................ | 320/128 |
| 2009/0200989 A1 * | 8/2009 | Veselic et al. ................. | 320/155 |
| 2009/0267571 A1 * | 10/2009 | Wolf et al. ..................... | 320/162 |
| 2010/0045243 A1 * | 2/2010 | Mizuno et al. ................ | 320/162 |
| 2010/0109602 A1 * | 5/2010 | Chang ........................... | 320/103 |

* cited by examiner

*Primary Examiner* — Vincent Tran (57) ABSTRACT

A system, a method, and a mobile terminal for sharing a battery between mobile terminals are disclosed, which can solve a problem that the battery can not be shared between mobile terminals in the prior art. In accordance with the present invention, a mobile terminal having power supplying ability is able to supply power to a mobile terminal lacking power by an external power supply line, power control circuits of the power supply end and the power utilization end are controlled, the power utilization end is able to detect an electricity quantity of the power supply end, and the sharing of a battery between two mobile terminals can be achieved, thereby greatly increasing utilization modes of the battery without external charging power supply so as to facilitate the using of a user.

6 Claims, 4 Drawing Sheets

SYSTEM, METHOD AND MOBILE TERMINAL FOR SHARING BATTERY BETWEEN MOBILE TERMINALS

This is a continuation of International Application PCT/CN2010/073703, with an International Filing Date of Jun. 9, 2010, which claims priority to Chinese Application No. 200910260372.7, filed Dec. 17, 2009, each of which is incorporated by reference.

FIELD OF THE INVENTION

The present invention relates to the technical field of mobile terminal devices, and in particular to a system, a method and a mobile terminal for sharing a battery between mobile terminals.

BACKGROUND OF THE INVENTION

As a portable device, a mobile terminal is more frequently used than other portable devices and has become the most frequently used portable device of a user and a main carrier for the communication, information management and entertainment of the user. Due to the characteristics of a portable device, the mobile terminal, whose power supply is realized by means of a built-in battery, usually does not use an external power supply to supply power after being charged. Therefore, the continuous using time of the mobile terminal is completely determined by the electricity quantity of the battery in the device. With respect to a portable device, the using time of the battery is an important technical reference index.

Currently, the power supply of the mobile terminal is basically based on the built-in rechargeable battery in the mobile terminal. Even for mobile terminals of the same type, their batteries are used independently. When one mobile terminal runs out of power, it is only possible to take out the battery of another mobile terminal and then replace the battery of the mobile terminal, which runs out of power, with the battery of the another mobile terminal, however, the another mobile terminal can not be used at the same time, causing inconvenience to the users. Therefore, in a working environment without charging fittings and with special requirements, the user desires to use the mobile terminals simultaneously when a mobile terminal runs out of power.

SUMMARY OF THE INVENTION

The present invention provides a system, a method and a mobile terminal for sharing a battery between mobile terminals, so as to address the problem that the battery can not be shared between mobile terminals in the prior art.

To solve the technical problem above, in one aspect, a system for sharing a battery between mobile terminals is provided, which comprises a mobile terminal of a power supply end and a mobile terminal of a power utilization end; wherein, the mobile terminal of the power supply end comprises a battery of the power supply end, a circuit interface of the power supply end and a power supply control unit of the power supply end, wherein the power supply control unit of the power supply end is coupled with the battery of the power supply end and the circuit interface of the power supply end respectively;

the mobile terminal of the power utilization end comprises a battery of the power utilization end, a circuit interface of the power utilization end, a power supply control unit of the power utilization end and a power management unit of the power utilization end, wherein the power management unit is coupled with the battery of the power utilization end and comprises a power supply switch subunit;

wherein the circuit interface of the power utilization end is coupled with the circuit interface of the power supply end; the power supply control unit of the power supply end is configured to control the battery of the power supply end to supply power to the mobile terminal of the power utilization end through the circuit interface of the power supply end;

the power supply switch subunit, coupled with the circuit interface of the power utilization end, the battery of the power utilization end and the power supply control unit of the power utilization end respectively, is configured to control the circuit interface of the power utilization end or the battery of the power utilization end to couple with the power supply control unit of the power utilization end; and the power supply control unit of the power utilization end is configured to supply power to the mobile terminal of the power utilization end.

Preferably, the mobile terminal of the power supply end further comprises:

a charging control unit of the power supply end, coupled with the battery of the power supply end, configured to perform charging control to the battery of the power supply end; and a power supply interface control unit, coupled between the circuit interface of the power supply end and the power supply control unit of the power supply end in series and coupled with the charging control unit of the power supply end, configured to control the circuit interface of the power supply end to couple with the charging control unit of the power supply end or the power supply control unit of the power supply end.

Preferably, the power management unit further comprises: a charging and power supply mode control subunit and an electricity quantity detection switch subunit sequentially coupled between the circuit interface of the power utilization end and the power supply switch subunit in series, and an electricity quantity detection subunit coupled with the electricity quantity detection switch subunit; the mobile terminal of the power utilization end further comprises a charging control unit of the power utilization end coupled with the battery of the power utilization end; wherein, the charging control unit of the power utilization end is configured to perform charging control to the battery of the power utilization end;

the charging and power supply mode control subunit, coupled with the charging control unit of the power utilization end, is configured to control whether the mobile terminal of the power supply end charges the battery of the power utilization end when the mobile terminal of the power supply end supplies power to the mobile terminal of the power utilization end; and the electricity quantity detection switch subunit is configured to control the electricity quantity detection subunit to detect an electricity quantity of the battery of the power utilization end or an electricity quantity of the battery of the power supply end.

In another aspect, a method for sharing a battery between mobile terminals is provided, comprising:

a mobile terminal of a power supply end supplying power to a mobile terminal of a power utilization end through a circuit interface of the power utilization end; and the mobile terminal of the power utilization end opening a power supply circuit of the battery of the power utilization end and closing a power supply circuit of the circuit interface of the power utilization end at the same time, thus enabling the mobile terminal of the power supply end to supply power to the mobile terminal of the power utilization end.

Preferably, before the mobile terminal of the power supply end supplies power to the mobile terminal of the power utilization end, the method further comprises the steps of:

the mobile terminal of the power utilization end determining whether to charge the battery of the power utilization end in the mobile terminal of the power utilization end, if yes, coupling the circuit interface of the power utilization end with a charging circuit; if no, breaking a coupling between the circuit interface of the power utilization end and the charging circuit.

Preferably, during the procedure that the mobile terminal of the power supply end supplies power to the mobile terminal of the power utilization end, the method further comprises the steps of:

the mobile terminal of the power utilization end detecting and displaying an electricity quantity of the battery of the power supply end of the mobile terminal of the power supply end.

In another aspect, a mobile terminal is provided, the mobile terminal comprises a battery of a power supply end, and the mobile terminal further comprises:

a circuit interface of the power supply end; and a power supply control unit of the power supply end, coupled with the battery of the power supply end and the circuit interface of the power supply end respectively, configured to control the battery of the power supply end to supply power externally through the circuit interface of the power supply end.

Preferably, the mobile terminal further comprises:

a charging control unit of the power supply end, coupled with the battery of the power supply end, configured to perform charging control to the battery of the power supply end; and a power supply interface control unit, coupled between the circuit interface of the power supply end and the power supply control unit of the power supply end in series, and coupled with the charging control unit of the power supply end, configured to control the circuit interface of the power supply end to couple with the charging control unit of the power supply end or the power supply control unit of the power supply end.

In another aspect, a mobile terminal is provided, comprising a battery of a power utilization end and a power management unit which is coupled with the battery of the power utilization end and comprises a power supply switch subunit, the mobile terminal further comprises a circuit interface of the power utilization end and a power supply control unit of the power utilization end; wherein, the circuit interface of the power utilization end is configured to couple with an external power supply device;

the power supply switch subunit, coupled with the circuit interface of the power utilization end, the battery of the power utilization end and the power supply control unit of the power utilization end respectively, is configured to control the circuit interface of the power utilization end or the battery of the power utilization end to couple with the power supply control unit of the power utilization end; and the power supply control unit of the power utilization end is configured to supply power to the mobile terminal.

Preferably, the power management unit further comprises a charging and power supply mode control subunit and an electricity quantity detection switch subunit sequentially coupled between the circuit interface of the power utilization end and the power supply switch subunit in series, and an electricity quantity detection subunit coupled with the electricity quantity detection switch subunit; the mobile terminal further comprises a charging control unit of the power utilization end coupled with the battery of the power utilization end; wherein, the charging control unit of the power utilization end is configured to perform charging control to the battery of the power utilization end;

the charging and power supply mode control subunit, coupled with the charging control unit of the power utilization end, is configured to control whether the external power supply device charges the battery of the power utilization end when the external power supply device supplies power to the mobile terminal of the power utilization end; and the electricity quantity detection switch subunit is configured to control the electricity quantity detection subunit to detect an electricity quantity of the battery of the power utilization end or an electricity quantity of a battery of the external power supply device.

In accordance with the present invention, a mobile terminal having power supplying ability is able to supply power to a mobile terminal lacking power by an external power supply line, power control circuits of the power supply end and the power utilization end are controlled, the power utilization end is able to detect an electricity quantity of the power supply end, and the sharing of a battery between two mobile terminals can be achieved, thereby greatly increasing utilization modes of the battery without external charging power supply so as to facilitate the utilization of a user.

DETAILED DESCRIPTION OF THE EMBODIMENTS

To solve the problem that the battery can not be shared between mobile terminals in the prior art, a system, a method and a mobile terminal for sharing a battery between mobile terminals are provided in the present invention, which will be detailed hereinafter in conjunction with the accompanying figures and the embodiments. It shall be understood that the embodiments described herein are only to illustrate the present invention, rather than limit it.

Figure 1:
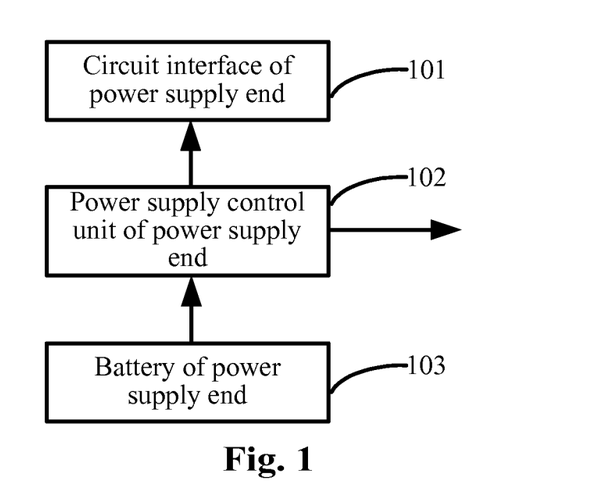
FIG. 1 is a schematic diagram of the structure of a mobile terminal of a power supply end in accordance with an embodiment of the present invention.
Figure 2:
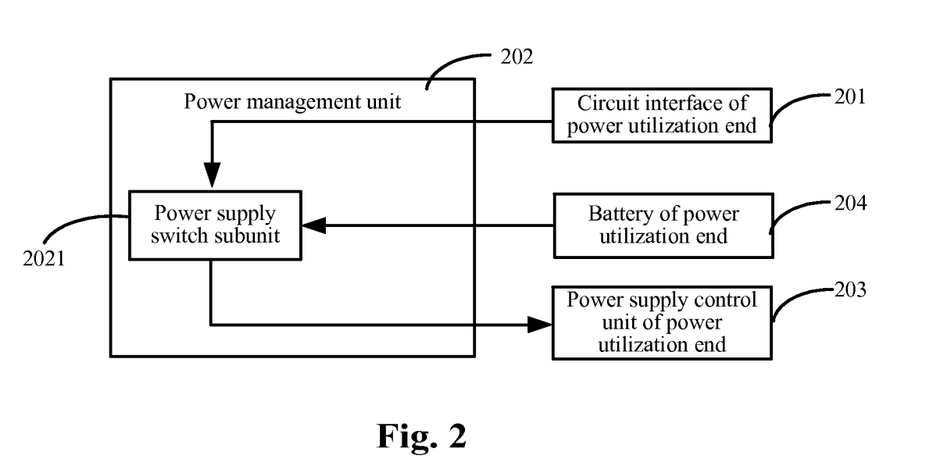
FIG. 2 is a schematic diagram of the structure of a mobile terminal of a power utilization end in accordance with an embodiment of the present invention.

As shown in FIGS. 1 and 2, Embodiment 1 of the present invention relates to a system for sharing a battery between mobile terminals, comprising a mobile terminal of a power supply end and a mobile terminal of a power utilization end.

The structure of the mobile terminal of the power supply end is as shown in FIG. 1, comprising a battery 103 of the power supply end, a circuit interface 101 of the power supply end and a power supply control unit 102 of the power supply end, wherein the power supply control unit 102 of the power supply end is coupled with the battery 103 of the power supply end and the circuit interface 101 of the power supply end respectively. The structure of the mobile terminal of the power utilization end is as shown in FIG. 2, comprising a battery 204 of the power utilization end, a circuit interface 201 of the power utilization end, a power supply control unit 203 of the power utilization end and a power management unit 202, wherein the power management unit 202 is coupled with the battery 204 of the power utilization end and comprises a power supply switch subunit 2021.

The circuit interface 201 of the power utilization end is coupled with the circuit interface 101 of the power supply end; the power supply control unit 102 of the power supply end is configured to control the battery 103 of the power supply end to supply power to the mobile terminal of the power utilization end through the circuit interface 101 of the power supply end;

the power supply switch subunit 2021, coupled with the circuit interface 201 of the power utilization end, the battery 204 of the power utilization end and the power supply control unit 203 of the power utilization end respectively, is configured to control the circuit interface 201 of the power utilization end or the battery 204 of the power utilization end to couple with the power supply control unit 203 of the power utilization end; and the power supply control unit 203 of the power utilization end is configured to supply power to the mobile terminal of the power utilization end.

When the mobile terminal of the power supply end supplies power locally, namely when the mobile terminal of the power supply end does not enable its battery sharing function thereby not supplying power to the mobile terminal of the power utilization end, the battery 103 of the power supply end in the mobile terminal of the power supply end is coupled with the power supply control unit 102 of the power supply end, and supplies power locally through the power supply control unit 102 of the power supply end. When the mobile terminal of the power supply end enables its battery sharing function thereby supplying power to the mobile terminal of the power utilization end, the battery 103 of the power supply end, the power supply control unit 102 of the power supply end and the circuit interface 101 of the power supply end are coupled serially in sequence, at this time, the power supply control unit 102 of the power supply end realizes, on the premise of ensuring the local power supply to the mobile terminal of the power supply end, the function of supplying power to the mobile terminal of the power utilization end through the circuit interface 101 of the power supply end connected with the mobile terminal of the power utilization end.

When the mobile terminal of the power utilization end supplies power through the battery 204 of the power utilization end, the power supply switch subunit 2021 of the power management unit 202 is coupled with the battery 204 of the power utilization end, thus enabling the power of the battery 204 of the power utilization end to supply power to the mobile terminal of the power utilization end locally through the power supply switch subunit 2021 and the power supply control unit 203 of the power utilization end coupled with the power supply switch subunit 2021. When the battery 204 of the power utilization end runs low or down, the circuit interface 101 of the power supply end is coupled with the circuit interface 201 of the power utilization end through a power supply line, so that the battery 103 of the power supply end in the mobile terminal of the power supply end supplies power to the mobile terminal of the power utilization end. A power supply voltage no higher than a local voltage of the mobile terminal of the power supply end can be provided by controlling the output voltage of the circuit interface 101 of the power supply end through the power supply control unit 102 of the power supply end, thus supplying power to the mobile terminal of the power utilization end with a power supply voltage no higher than the above local voltage. At this time, the power supply switch subunit 2021 breaks its coupling with the battery 204 of the power utilization end and couples with the circuit interface 201 of the power utilization end, thus the power provided by the battery 103 of the power supply end is supplied to the power supply control unit 203 of the power utilization end through the circuit interface 101 of the power supply end, the circuit interface 201 of the power utilization end and the power supply switch subunit 2021. The power supply control unit 203 of the power utilization end adjusts the voltage and the electricity quantity according to parameters (such as voltage, current and electricity quantity) used by the mobile terminal of the power utilization end and finally supplies power to the mobile terminal of the power utilization end. The sharing of the battery 103 of the power supply end between the mobile terminals of the power supply end and the power utilization end is realized, and the purpose of using the two mobile terminals of the power supply end and the power utilization end simultaneously is reached.

In addition, since most of the mobile terminals use rechargeable battery or require data transfer, a mobile terminal is usually provided with a charging interface or a data interface. Due to the requirements for the portability of a mobile terminal, they are limited in size and interface quantity. Moreover, considering that the charging interface or some data interfaces can be used as power supply interface, the additional use of the charging interface or data interfaces on the mobile terminal of the power supply end as the circuit interface 101 of the power supply end is designed in the embodiment.

Figure 3:
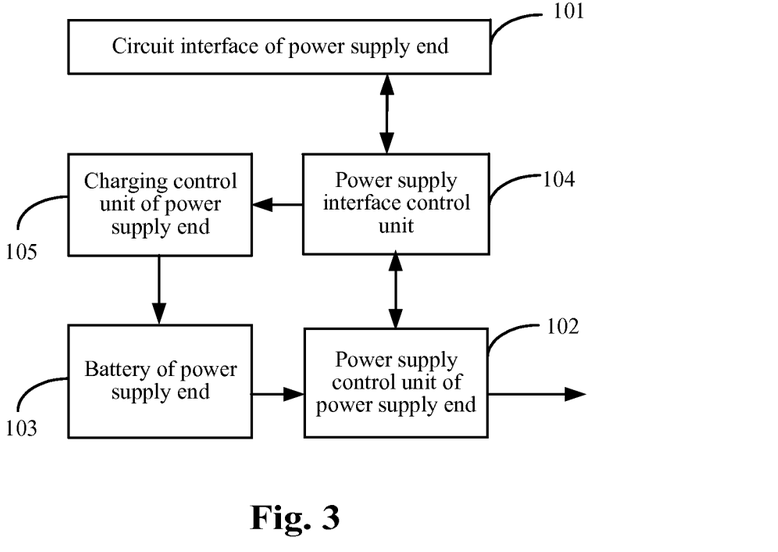
FIG. 3 is a schematic diagram of the structure of another mobile terminal of a power supply end in accordance with an embodiment of the present invention.

As shown in FIG. 3, on the basis of the embodiment above, the mobile terminal of the power supply end further comprises: a charging control unit 105 of the power supply end and a power supply interface control unit 104, wherein the charging control unit 105 of the power supply end is coupled with the battery 103 of the power supply end; the power supply interface control unit 104 is coupled serially between the circuit interface 101 of the power supply end and the power supply control unit 102 of the power supply end and is coupled with the charging control unit 105 of the power supply end. The charging control unit 105 of the power supply end is configured to perform charging control to the battery 103 of the power supply end; and the power supply interface control unit 104 is configured to control the circuit interface 101 of the power supply end to couple with the charging control unit 105 of the power supply end or the power supply control unit 102 of the power supply end. Namely, when the circuit interface 101 of the power supply end is used as a charging interface, the power supply interface control unit 104 controls the circuit interface 101 of the power supply end to couple with the charging control unit 105 of the power supply end, and breaks the coupling between the circuit interface 101 of the power supply end and the power supply control unit 102 of the power supply end. In this way, the battery 103 of the power supply end can be charged and can supply power locally through the power supply control unit 102 of the power supply end.

When the circuit interface 101 of the power supply end is coupled with the power supply line, the user configures to enable the battery sharing function of the mobile terminal of the power supply end to supply power to the mobile terminal of the power utilization end. Namely, when the circuit interface 101 of the power supply end is used as the power supply interface, the power supply interface control unit 104 breaks the coupling between the circuit interface 101 of the power supply end and the charging control unit 105 of the power supply end, couples the circuit interface 101 of the power supply end with the power supply control unit 102 of the power supply end, reads configuration parameters such as voltage, and configures the power supply control unit 102 of the power supply end. Thus the battery 103 of the power supply end can supply power externally through the circuit interface 101 of the power supply end when simultaneously supplying power locally through the power supply control unit 102 of the power supply end.

Moreover, when the mobile terminal of the power supply end supplies power to the mobile terminal of the power utilization end, there may exist a case that the mobile terminal of the power utilization end cannot be coupled with the mobile terminal of the power supply end through the power supply line for a long period of time, so the user has the requirement of charging the mobile terminal of the power utilization end by the mobile terminal of the power supply end. In addition, when the mobile terminal of the power supply end supplies power to the mobile terminal of the power utilization end, the residual electricity quantity of the battery 103 of the power supply end is critical to the mobile terminal of the power supply end and the mobile terminal of the power utilization end, so it is necessary to detect the residual electricity quantity of the battery 103 of the power supply end, so as to remind the user to conduct corresponding operation. In view of the above, the mobile terminal of the power utilization end is further designed in the embodiment of the present invention.

Figure 4:
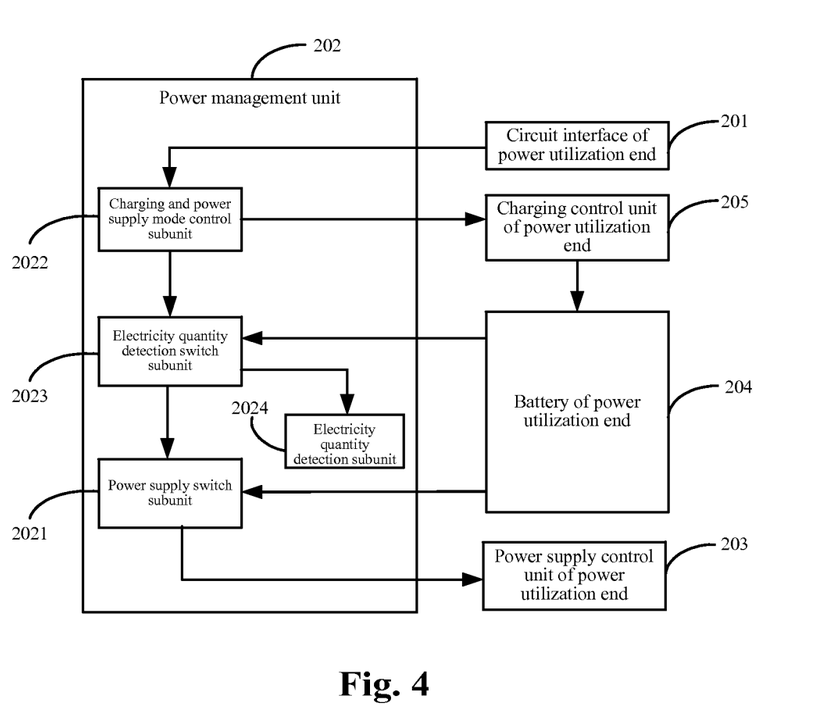
FIG. 4 is a schematic diagram of the structure of another mobile terminal of power utilization end in accordance with an embodiment of the present invention.

As shown in FIG. 4, on the basis of the embodiment above, the mobile terminal of the power utilization end also comprises a charging control unit 205 of the power utilization end coupled with the battery 204 of the power utilization end; the power management unit 202 also comprises a charging and power supply mode control subunit 2022, an electricity quantity detection switch subunit 2023 and an electricity quantity detection subunit 2024, wherein the charging and power supply mode control subunit 2022 and the electricity quantity detection switch subunit 2023 are coupled serially between the circuit interface 201 of the power utilization end and the power supply switch subunit 2021 in sequence, and the electricity quantity detection subunit 2024 is coupled with the electricity quantity detection switch subunit 2023. The charging control unit 205 of the power utilization end is configured to perform charging control to the battery 204 of the power utilization end; the charging and power supply mode control subunit 2022 is coupled with the charging control unit 204 of the power utilization end and is configured to control whether the mobile terminal of the power supply end charges the battery 204 of the power utilization end when the mobile terminal of the power supply end supplies power to the mobile terminal of the power utilization end; and the electricity quantity detection switch subunit 2023 is configured to control the electricity quantity detection subunit 2024 to detect the electricity quantity of the battery 103 of the power supply end or the electricity quantity of the battery 204 of the power utilization end.

After the circuit interface 201 of the power utilization end in the mobile terminal of the power utilization end is coupled with the power supply line, firstly, the mobile terminal of the power utilization end determines whether to charge the battery 204 of the power utilization end when the mobile terminal of the power supply end supplies power to the mobile terminal of the power utilization end, if the answer is yes, the charging and power supply mode control subunit 2022 controls the circuit interface 201 of the power utilization end to couple with the charging control unit 205 of the power utilization end so as to charge the battery 204 of the power utilization end through the charging control unit 205 of the power utilization end, and simultaneously keeps the coupling between the circuit interface 201 of the power utilization end and the power supply switch subunit 2021 so as to supply power to the mobile terminal of the power utilization end; if the answer is no, the charging and power supply mode control subunit 2022 breaks the coupling between the circuit interface 201 of the power utilization end and the charging control unit 205 of the power utilization end, and only keeps the coupling between the circuit interface 201 of the power utilization end and the power supply switch subunit 2021 so as to supply power to the mobile terminal of the power utilization end.

When the mobile terminal of the power utilization end is supplied with power through the battery 204 of the power utilization end, the electricity quantity detection switch subunit 2023 controls the electricity quantity detection subunit 2024 to detect an end voltage of the battery 204 of the power utilization end and a voltage attenuation, estimate a capacity of the battery 103 of the power supply end, write the estimated capacity in a PMU status register for the access of an UI (User Interface), and display the current electricity quantity. During the procedure that the mobile terminal of the power supply end supplies power to the mobile terminal of the power utilization end, the electricity quantity detection switch subunit 2023 controls the electricity quantity detection subunit 2024 to detect the end voltage of the battery 103 of the power supply end and the voltage attenuation, estimate the capacity of the battery 103 of the power supply end, write the estimated capacity in the PMU status register for the access of the UI, and display the current electricity quantity.

It can be seen from the embodiment above that, through supplying power to the mobile terminal of the power utilization end by the mobile terminal of the power supply end, the embodiment of the present invention achieves sharing the battery of the power supply end between the mobile terminals of the power supply end and the power utilization end, reduces the hardware added by the additional use of the interfaces, simplifies the structure and realizes the function of charging to the battery of the power utilization end, thus facilitating using of a user.

Figure 5:
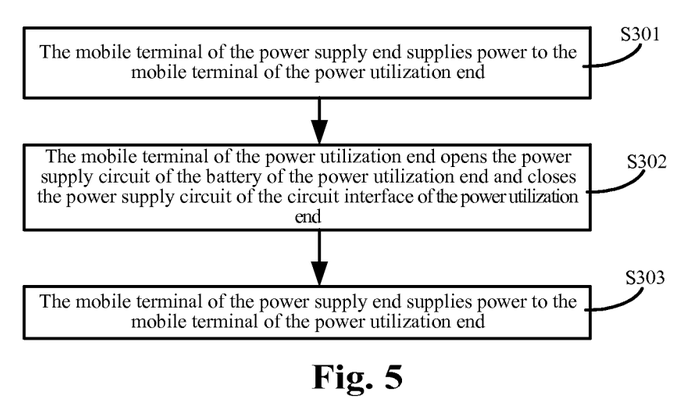
FIG. 5 is a flowchart of a method for sharing a battery between mobile terminals in accordance with an embodiment of the present invention.

As shown in FIG. 5, Embodiment 2 of the present invention relates to a method for sharing a battery between mobile terminals, comprising the steps as follows.

S301, a mobile terminal of a power supply end supplies power to a mobile terminal of a power utilization end through a circuit interface of the power utilization end.

Figure 6:
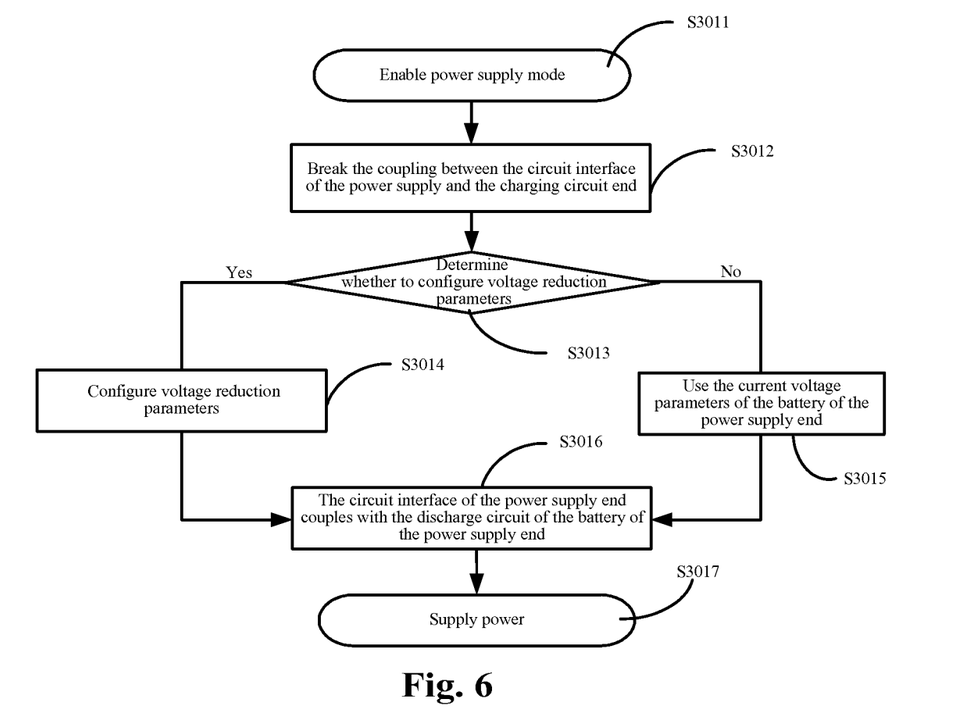
FIG. 6 is a flowchart when a mobile terminal of a power supply end supplies power externally in accordance with an embodiment of the present invention.

As shown in FIG. 6, if a charging interface of the mobile terminal of the power supply end is additionally used as the circuit interface of the power supply end in the mobile terminal of the power supply end, the step above comprises the steps as follows.

S3011, after the mobile terminal of the power supply end is coupled with the mobile terminal of the power utilization end through a power supply line, a power supply mode is enabled.

S3012, since the circuit interface of the power supply end is used as a charging interface when the mobile terminal of the power supply end does not supply power externally, the circuit interface of the power supply end is coupled with a charging circuit, namely the circuit interface of the power supply end is coupled with the charging control unit of the power supply end so as to charge the battery of the power supply end through the charging control unit of the power supply end. When the mobile terminal of the power supply end supplies power externally, the circuit interface of the power supply end is not used as a charging interface any more, thus it is required to break the coupling between the circuit interface of the power supply end and the charging circuit.

S3013, since a rated operational voltage in normal operation may vary with different mobile terminals, it is required to determine whether to configure a voltage reduction parameter before supplying power to the mobile terminal of the power utilization end, if the answer is yes, turn to S3014, otherwise, turn to S3015.

S3014, the voltage reduction parameter is configured according to parameters such as rated operational voltage and rated operational current of the mobile terminal of the power utilization end, and then turn to S3016.

S3015, the current voltage parameter of the battery of the power supply end is used, and turn to S3016.

S3016, the circuit interface of the power supply end is coupled with a discharge circuit of the battery of the power supply end, namely the circuit interface of the power supply end is coupled with the battery of the power supply end through the power supply control unit of the power supply end.

S3017, the power supply control unit of the power supply end supplies power, through the circuit interface of the power supply end, to the mobile terminal of the power utilization end connected with it when locally supplying power to the mobile terminal of the power supply end at the same time.

S302, the mobile terminal of the power utilization end opens a power supply circuit of the battery of the power utilization end and closes a power supply circuit of the circuit interface of the power utilization end.

Figure 7:
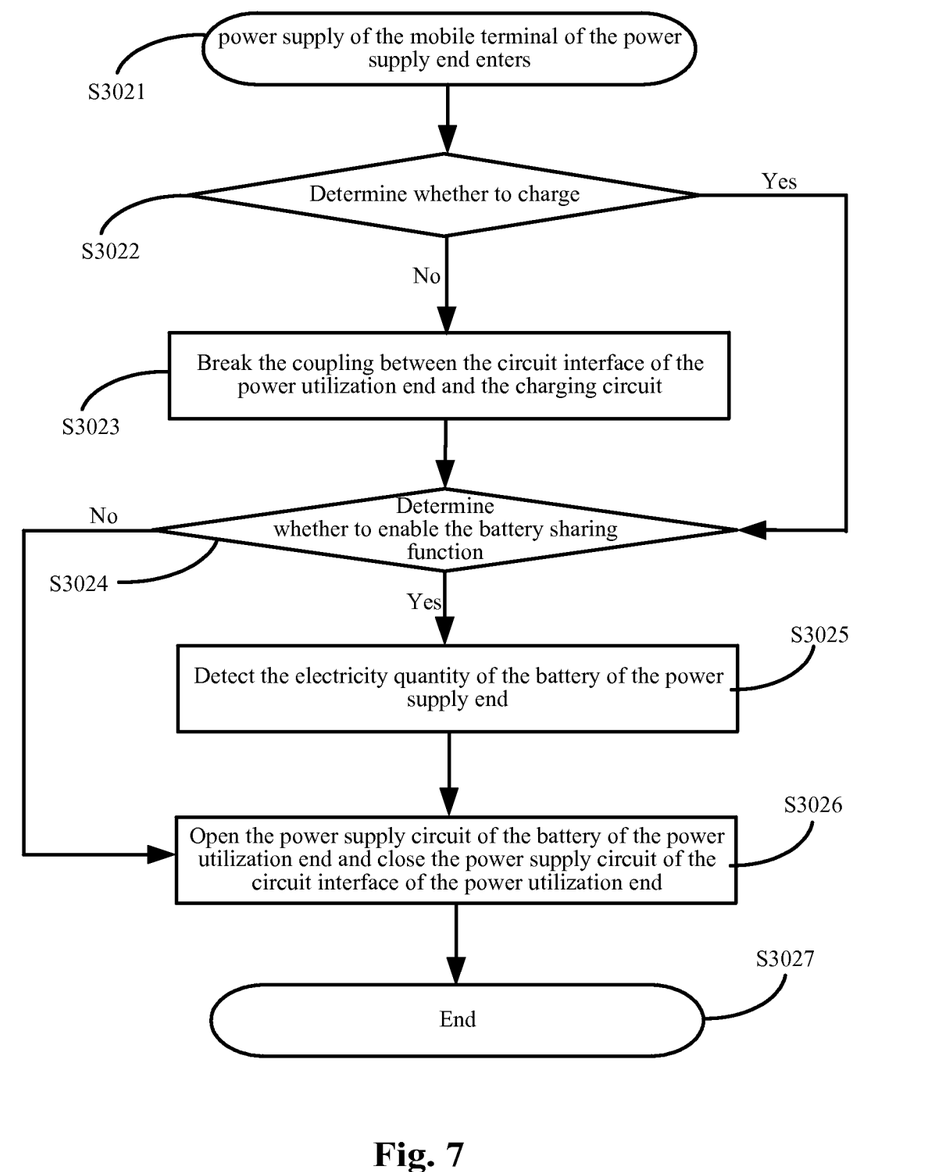
FIG. 7 is a flowchart when a mobile terminal of a power utilization end receives power from external in accordance with an embodiment of the present invention.

As shown in FIG. 7, in the case that the mobile terminal of the power supply end is also required to charge the battery of the power utilization end when supplying power to the mobile terminal of the power utilization end, S302 specifically comprises the steps as follows.

S3021, power supply of the mobile terminal of the power supply end enters to supply power to the mobile terminal of the power utilization end.

S3022, firstly, it is determined whether it is required to charge the battery of the power utilization end in the mobile terminal of power utilization end when the mobile terminal of the power supply end supplies power to the mobile terminal of the power utilization end, if it is required to do so, keep the coupling between the circuit interface of the power utilization end and the charging circuit, namely keep the coupling between the circuit interface of the power utilization end and the charging control unit of the power utilization end, then turn to S3024; if it is not required to do so, turn to S3023.

S3023, the coupling between the circuit interface of the power utilization end and the battery of the power utilization end is broke, namely the coupling between the circuit interface of the power utilization end and the charging control unit of the power utilization end is broke, and then turn to S3024.

S3024, it is determined whether the mobile terminal of the power utilization end enables the battery sharing function, namely it is determined whether the mobile terminal of the power utilization end has an external power input, if the mobile terminal of the power utilization end has the external power input, it indicates that the battery sharing function is enabled, turn to S3025; if the mobile terminal of the power utilization end has no external power input, it indicates that the battery sharing function is disabled, turn to S3026.

S3025, the mobile terminal of the power utilization end detects the end voltage of the battery of the power supply end in the mobile terminal of the power supply end and the voltage attenuation, estimates the capacity of the battery of the power supply end, writes the estimated capacity in the PMU status register for the access of the U1, and finally displays the current electricity quantity.

S3026, the power supply circuit of the battery of the power utilization end is opened (namely the coupling between the battery of the power utilization end and the power supply switch subunit of the PMU is broke), and at the same time the power supply circuit of the circuit interface of the power utilization end is closed (namely couple the circuit interface of the power utilization end with the power supply switch subunit).

S3027, the end, namely the circuit that the mobile terminal of the power supply end supplies power to the mobile terminal of the power utilization end is completed.

S303, the mobile terminal of the power supply end supplies power to the mobile terminal of the power utilization end.

The using of USB (Universal Serial Bus) as circuit interfaces of the power supply end and the power utilization end is taken as an example to detail the solution of the embodiment.

Currently, the mobile terminals are usually provided with USB interfaces for data transfer and charging. A standard USB interface provides a voltage of 5V and an output current of 0.5A, and has 4 effective leads of two data cables and two power cords, wherein the power cords are coupled to the PMU pins respectively for charging and power supply. The USB interface of the mobile terminal of the power supply end is additionally used as the power supply circuit interface. The method for sharing a battery between mobile terminals comprises the steps as follows.

1. the USB interface is additionally used as the power supply circuit interface of the mobile terminal of the power supply end.

A USB interface control switch is added to control a charging circuit (power management unit, PMU) and a discharge circuit of the battery of the power supply end coupled with the USB interface. The user can configure the control switch to control the USB interface to couple with the charging circuit or the discharge circuit. If the battery of the mobile terminal provides an output voltage of 4.2V, the USB interface, in the case of coupling with the discharge circuit, can provide an output voltage of 4.2V. If a power supply IC is coupled serially, the interface can be controlled to provide an output voltage no higher than 4.2V by controlling the power supply IC. Or a diode can be coupled serially to provide a voltage output reduced to a fixed value.

2. the USB interface of the mobile terminal of the power utilization end is coupled with the PMU of the mobile terminal of the power utilization end. The PMU can control the closing or opening of the charging circuit and power supply circuit of the battery of the power utilization end by programming to switch the power supply and charging modes. The PMU can also control the range of the input voltage and reduce the input voltage to the allowable voltage range of the mobile terminal of the power utilization end, thus providing conforming current to supply power to the mobile terminal of the power utilization end. For example, if the power supply voltage of the mobile terminal of the power utilization end is 3.9V, the power supply circuit will provide a voltage output of 3.9V through voltage reduction. The charging circuit refers to the circuit involved in charging the battery of the power utilization end; and the power supply end refers to the circuit involved in supplying power to the mobile terminal of the power utilization end.

3. through configuring the mobile terminal of the power utilization end in battery sharing mode, the PMU switches the electricity quantity detection to entered power supply line so as to detect the voltage attenuation of the battery of the power supply end, estimate the capacity of the battery of the power supply end and write the estimated capacity into the status register of the PMU for the access of the UI and the display of the current electricity quantity.

It shall be known from the description above that, through the method, the existing interface can be additionally used with a few hardware added and low cost increased which can achieve battery sharing, especially in the case of no available charging fittings, can enrich the using modes of the battery between mobile terminals. Moreover, by way of controlling the mobile terminal of the power utilization end, the power supply voltage can be configured flexibly, ensuring the safe use of the mobile terminal of the power utilization end. The mobile terminal of the power utilization end can simulate the battery capacity of the mobile terminal of the power supply end by detecting the input voltage so as to facilitate using of a user. The mobile terminal of the power utilization end can be switched between the power supply mode and charging/power supply mode through configuration, which can utilize the battery capacity of the mobile terminal of the power supply end effectively and facilitate using of a user.

Although the preferable embodiments of the present invention are disclosed for exemplary purpose, those skilled in the art shall realize that various improvements, addition and replacement may be possible. Therefore, the scope of the present invention shall not be limited to the embodiments above.

What is claimed is:

1. A system for sharing a battery between mobile terminals, comprising a mobile terminal of a power supply end and a mobile terminal of a power utilization end, wherein,
the mobile terminal of the power supply end comprises a battery of the power supply end, a circuit interface of the power supply end and a power supply control unit of the power supply end, wherein the power supply control unit of the power supply end is coupled with the battery of the power supply end and the circuit interface of the power supply end respectively;
the mobile terminal of the power utilization end comprises a battery of the power utilization end, a circuit interface of the power utilization end, a power supply control unit of the power utilization end and a power management unit, wherein the power management unit is coupled with the battery of the power utilization end and comprises a power supply switch subunit;
wherein the circuit interface of the power utilization end is coupled with the circuit interface of the power supply end; the power supply control unit of the power supply end is configured to control the battery of the power supply end to supply power to the mobile terminal of the power utilization end through the circuit interface of the power supply end;
the power supply switch subunit, coupled with the circuit interface of the power utilization end, the battery of the power utilization end and the power supply control unit of the power utilization end respectively, is configured to control the circuit interface of the power utilization end or the battery of the power utilization end to couple with the power supply control unit of the power utilization end; and the power supply control unit of the power utilization end is configured to supply power to the mobile terminal of the power utilization end;

wherein the power management unit further comprises: a charging and power supply mode control subunit and an electricity quantity detection switch subunit sequentially coupled between the circuit interface of the power utilization end and the power supply switch subunit in series, and an electricity quantity detection subunit coupled with the electricity quantity detection switch subunit; the mobile terminal of the power utilization end further comprises a charging control unit of the power utilization end coupled with the battery of the power utilization end; wherein, the charging control unit of the power utilization end is configured to perform charging control to the battery of the power utilization end;

the charging and power supply mode control subunit, coupled with the charging control unit of the power utilization end, is configured to control whether the mobile terminal of the power supply end charges the battery of the power utilization end when the mobile terminal of the power supply end supplies power to the mobile terminal of the power utilization end; and the electricity quantity detection switch subunit is configured to control the electricity quantity detection subunit to detect an electricity quantity of the battery of the power utilization end or an electricity quantity of the battery of the power supply end.

2. The system for sharing a battery between mobile terminals according to claim 1, wherein the mobile terminal of the power supply end further comprises:
a charging control unit of the power supply end, coupled with the battery of the power supply end, configured to perform charging control to the battery of the power supply end; and
a power supply interface control unit, coupled between the circuit interface of the power supply end and the power supply control unit of the power supply end in series and coupled with the charging control unit of the power supply end, configured to control the circuit interface of the power supply end to couple with the charging control unit of the power supply end or the power supply control unit of the power supply end.

3. A method for sharing a battery between mobile terminals, comprising the steps of:
a mobile terminal of a power supply end supplying power to a mobile terminal of a power utilization end through a circuit interface of the power utilization end; and
the mobile terminal of the power utilization end opening a power supply circuit of the battery of the power utilization end in the mobile terminal of the power utilization end and closing a power supply circuit of the circuit interface of the power utilization end at the same time, thus enabling the mobile terminal of the power supply end to supply power to the mobile terminal of the power utilization end;
wherein a charging control unit of the power utilization end performing charging control to the battery of the power utilization end;
a charging and power supply mode control subunit controlling whether the mobile terminal of the power supply end charges the battery of the power utilization end when the mobile terminal of the power supply end supplies power to the mobile terminal of the power utilization end; and an electricity quantity detection switch subunit controlling an electricity quantity detection subunit to detect an electricity quantity of the battery of the power supply end.

4. The method for sharing a battery between mobile terminals according to claim 3, wherein before the mobile terminal of the power supply end supplies power to the mobile terminal of the power utilization end, the method further comprises the steps of:

the mobile terminal of the power utilization end determining whether to charge the battery of the power utilization end in the mobile terminal of the power utilization end, if yes, coupling the circuit interface of the power utilization end with a charging circuit; if no, breaking a coupling between the circuit interface of the power utilization end and the charging circuit.

5. The method for sharing a battery between mobile terminals according to claim 3, wherein during the procedure that the mobile terminal of the power supply end supplies power to the mobile terminal of the power utilization end, the method further comprises the steps of:

the mobile terminal of the power utilization end detecting and displaying an electricity quantity of the battery of the power supply end of the mobile terminal of the power supply end.

6. A mobile terminal, comprising a battery of a power utilization end, a power management unit coupled with the battery of the power utilization end, wherein the power management unit comprises a power supply switch subunit, and the mobile terminal further comprises a circuit interface of the power utilization end and a power supply control unit of the power utilization end; wherein, the circuit interface of the power utilization end is configured to couple with an external power supply device;

the power supply switch subunit, coupled with the circuit interface of the power utilization end, the battery of the power utilization end and the power supply control unit of the power utilization end respectively, is configured to control the circuit interface of the power utilization end or the battery of the power utilization end to couple with the power supply control unit of the power utilization end; and the power supply control unit of the power utilization end is configured to supply power to the mobile terminal;

wherein the power management unit further comprises a charging and power supply mode control subunit and an electricity quantity detection switch subunit sequentially coupled between the circuit interface of the power utilization end and the power supply switch subunit in series and an electricity quantity detection subunit coupled with the electricity quantity detection switch subunit; the mobile terminal further comprises a charging control unit of the power utilization end coupled with the battery of the power utilization end; wherein, the charging control unit of the power utilization end is configured to perform charging control to the battery of the power utilization end;

the charging and power supply mode control subunit, coupled with the charging control unit of the power utilization end, is configured to control whether the external power supply device charges the battery of the power utilization end when the external power supply device supplies power to the mobile terminal of the power utilization end; and the electricity quantity detection switch subunit is configured to control the electricity quantity detection subunit to detect an electricity quantity of the battery of the power utilization end or an electricity quantity of a battery of the external power supply device.

* * * * *